United States Patent [19]

Ludwig

[11] 4,206,732
[45] Jun. 10, 1980

[54] AIR CLEANER TEMPERATURE SENSOR

[75] Inventor: George C. Ludwig, Owosso, Mich.

[73] Assignee: Tom McGuane Industries, Inc., Madison Heights, Mich.

[21] Appl. No.: 955,976

[22] Filed: Oct. 30, 1978

[51] Int. Cl.$^2$ ............................................. F02M 31/00
[52] U.S. Cl. ............................ 123/122 D; 123/122 H; 236/13
[58] Field of Search .......... 236/13; 123/122 D, 122 H

[56] References Cited

U.S. PATENT DOCUMENTS

| | | | |
|---|---|---|---|
| 3,459,163 | 8/1969 | Lewis | 123/122 D |
| 3,858,565 | 1/1975 | Buckman | 123/122 D |
| 3,973,728 | 8/1976 | Colenutt | 123/122 D |

*Primary Examiner*—Ronald H. Lazarus
*Attorney, Agent, or Firm*—Barnes, Kisselle, Raisch & Choate

[57] ABSTRACT

An air cleaner temperature sensor for use in sensing the temperature of the air in an air cleaner and modulating the temperature of the air entering the air cleaner in response to the temperature in the air cleaner comprising a plastic body having an inlet adapted to be connected to a vacuum source and an outlet through which the vacuum can be connected to a motor for controlling the flow of air to the air cleaner. The body includes an opening to the ambient air surrounding the body, a valve in said opening and a bimetallic element is supported by the body and is operable to control the valve element such that the flow of air through the ambient air inlet is controlled by the bimetallic element, the body has a cover and an integral plastic hinge connecting the cover to the body. The cover has a portion thereof extending along the side wall of the body and an interengaging mechanical means between the cover and the body to lock the cover in position.

16 Claims, 12 Drawing Figures

U.S. Patent  Jun. 10, 1980  Sheet 1 of 3  4,206,732
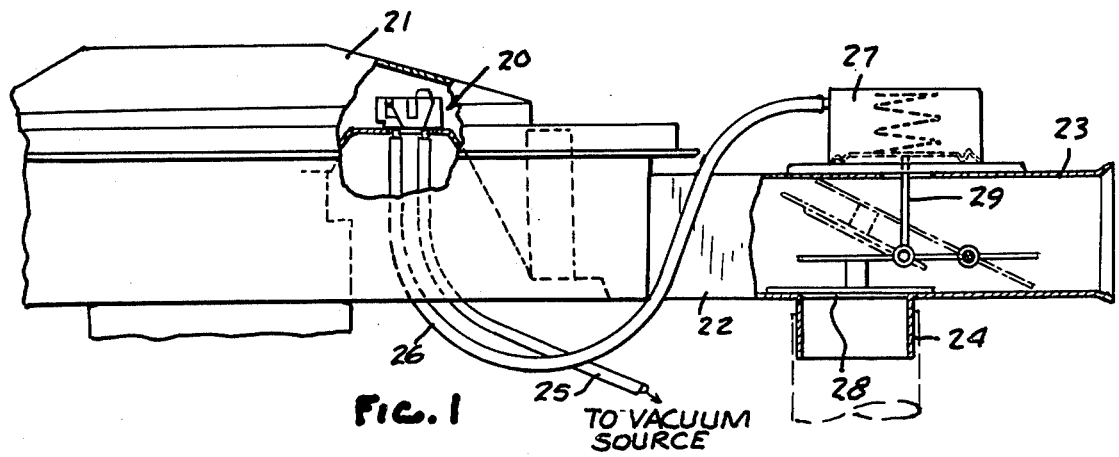
FIG. 1
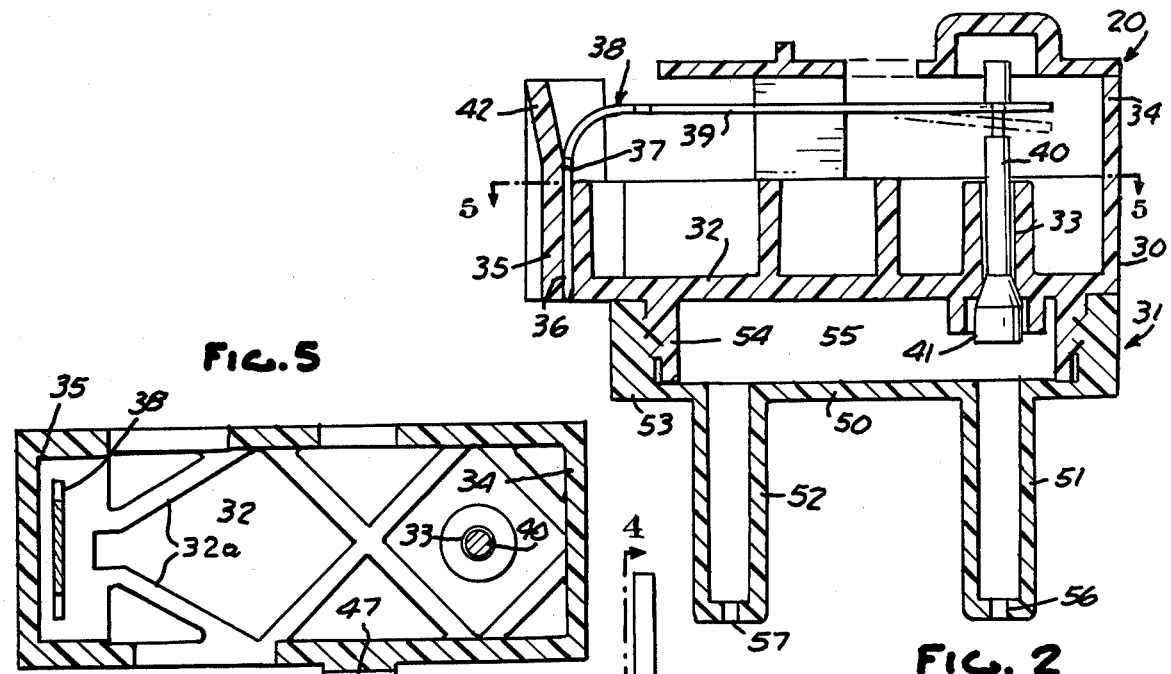
FIG. 5
FIG. 2
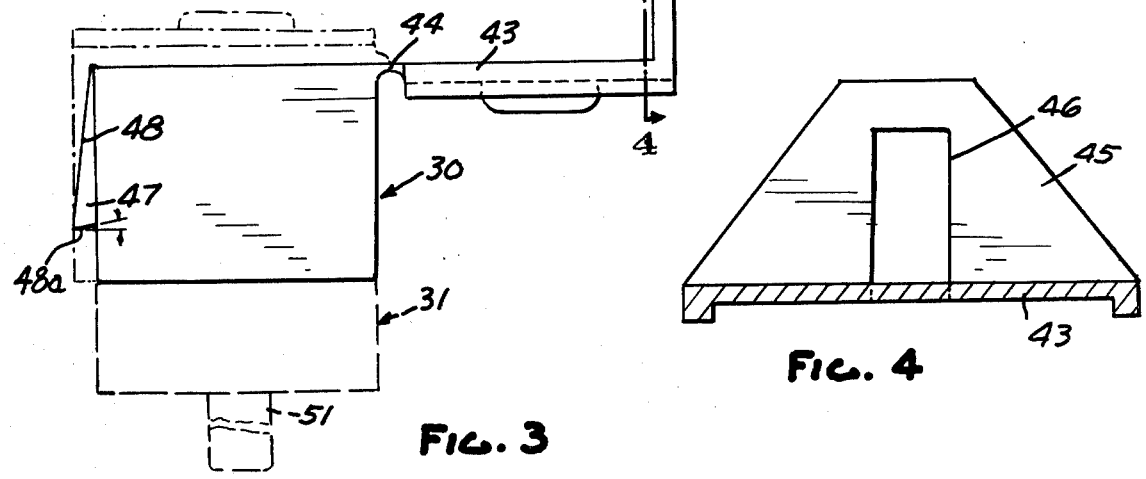
FIG. 3
FIG. 4

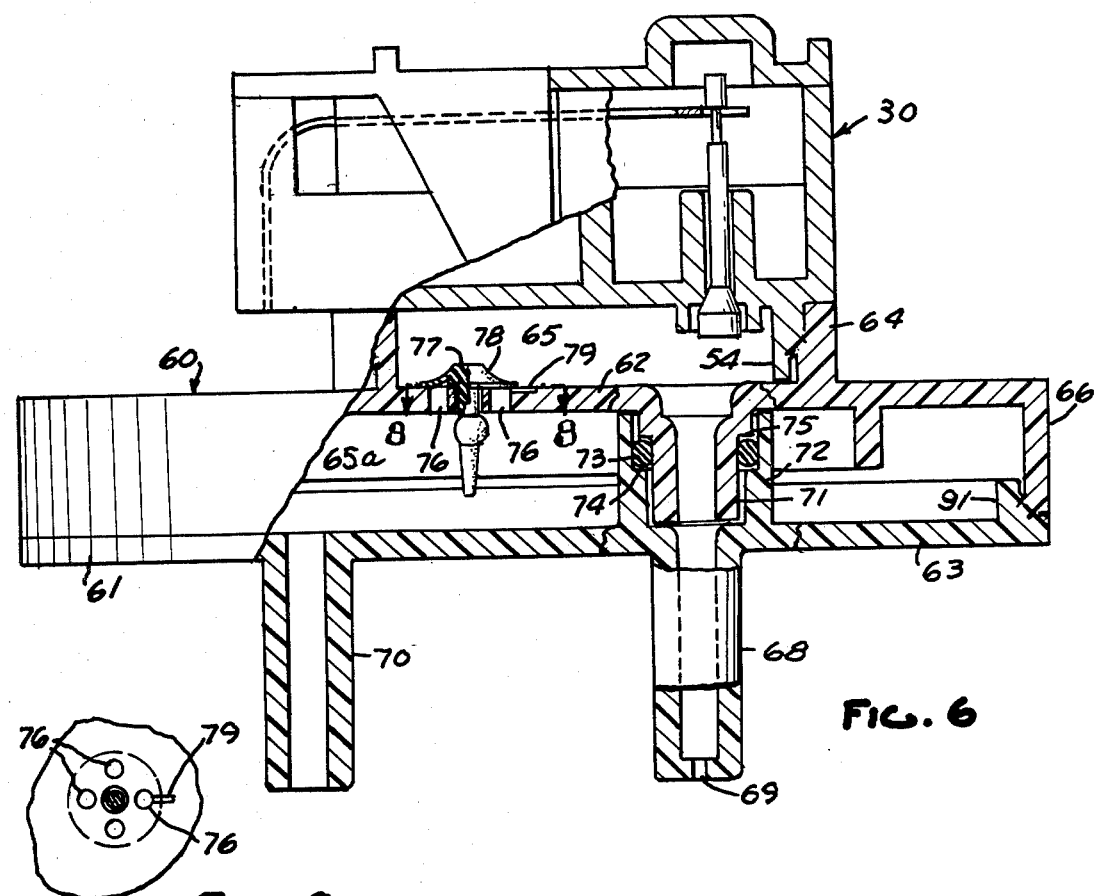
FIG. 6
FIG. 8
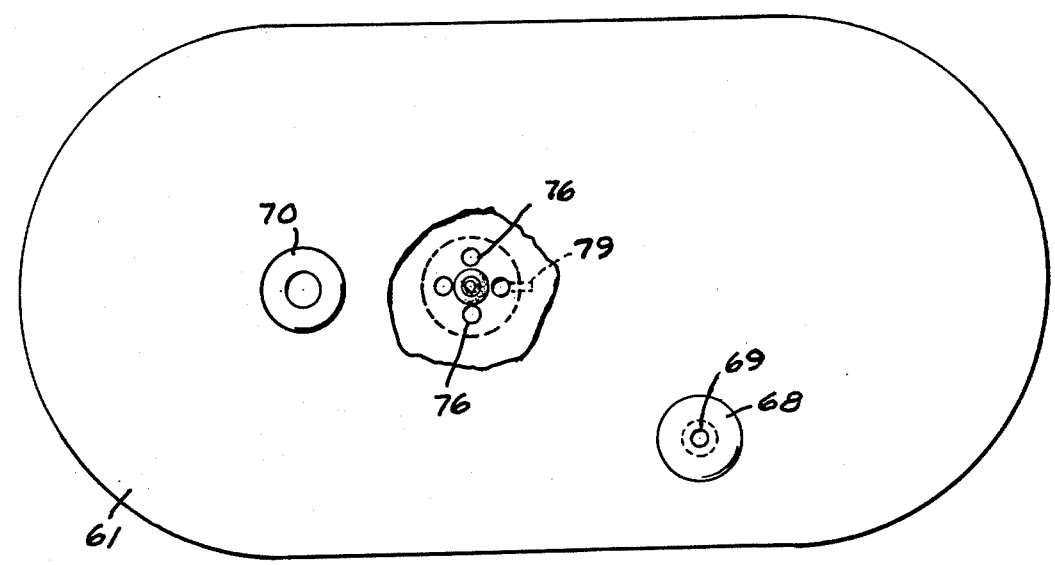
FIG. 7

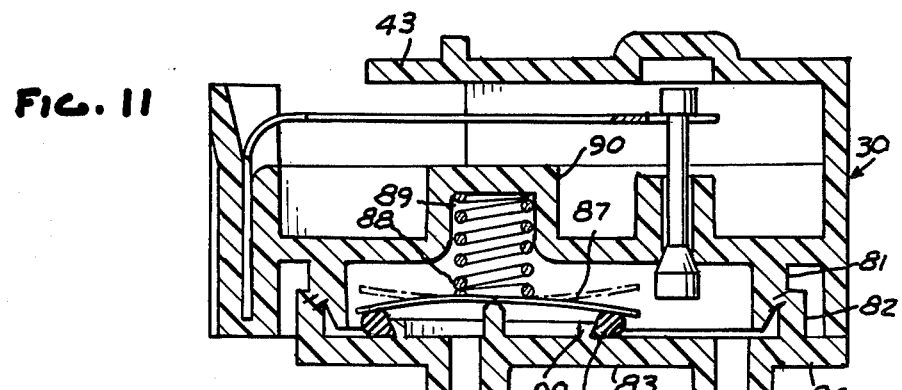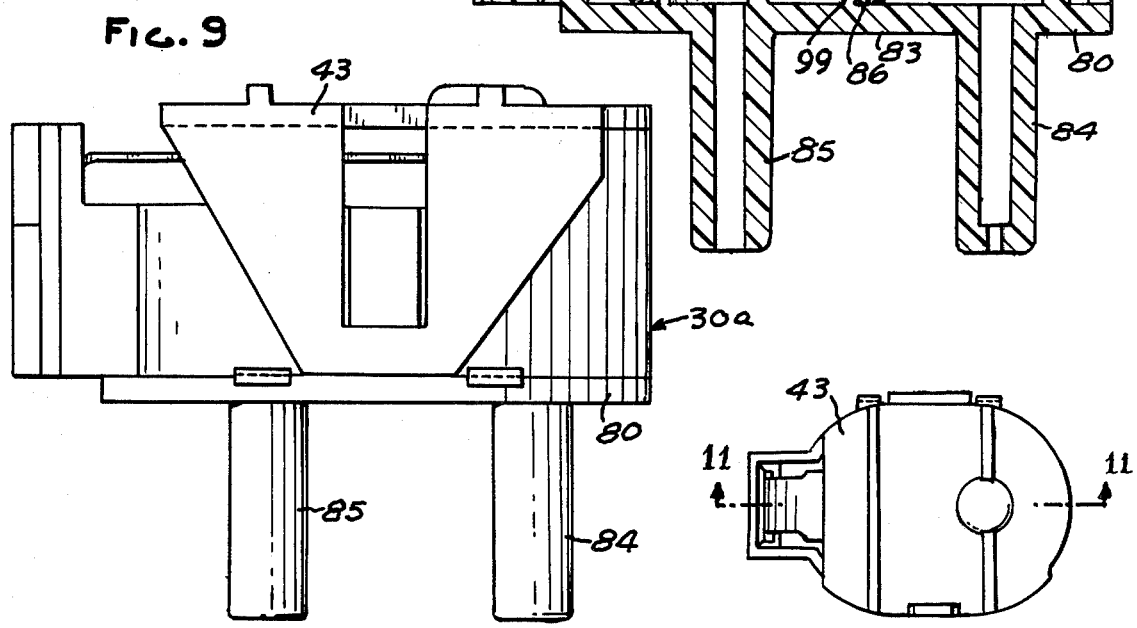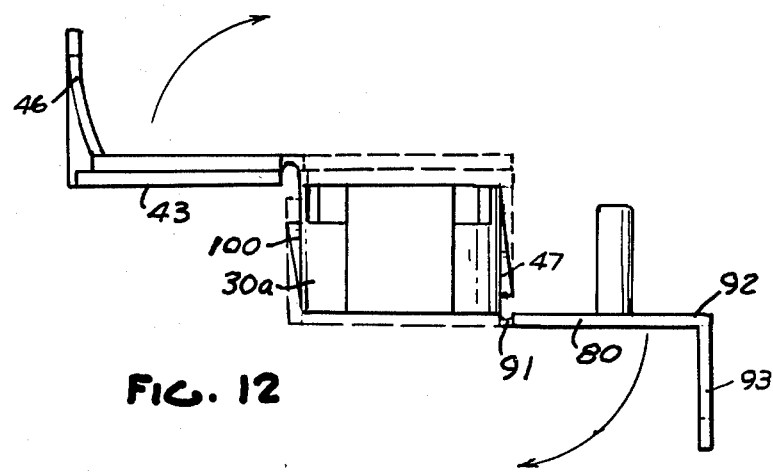

4,206,732

1

AIR CLEANER TEMPERATURE SENSOR

This invention relates to apparatus for modulating the temperature of the air being supplied to the engine of an automotive vehicle and particularly to the temperature sensors associated with such apparatus.

BACKGROUND AND SUMMARY OF THE INVENTION

In the control of the operation of the engines of automotive vehicles, it is common to utilize a temperature sensor in the air cleaner to control the blend of cold and hot air passing to the air cleaner and in turn, the carburetor of the engine. Such temperature sensors are shown in the U.S. Pat. Nos. to Lewis 3,459,163, Kearsley 3,513,817 and Charles 3,744,716.

A problem in connection with the manufacture of such temperature sensors is that they must be calibrated to produce the desired temperature control. During the calibration, the bimetallic element that is usually associated with the temperature sensor is adjusted after which the assembly is completed. During the final assembly, it is possible that the various operations will result in movement with the resultant loss of calibration.

Accordingly, the present invention is directed toward making an air cleaner temperature sensor which will obviate or minimize the possibility of loss of calibration during the final assembly step.

Another problem that arises in connection with prior air cleaner temperature sensors is that they usually modulate the vacuum to a vacuum motor that functions to control the blend of hot and cold air passing to the air cleaner. However, when a full throttle acceleration is made, engine vacuum is zero and the vacuum motor which is being controlled by the vacuum translates to a full cold position regardless of the temperature in the air cleaner. This results in maximum air density and maximum horsepower for a full throttle acceleration. While this is acceptable for an engine at normal operating temperature, full throttle accelerations on a cold engine often cause engine loss due to the increased density of the unheated air causing a leaner mixture below the proper combustion level. It has been found that if the motor that controls the mixture of air is maintained in a position permitting full hot air to pass to the air cleaner during engine warm-up, engine operation is improved. Thus, another aspect of the present invention is to provide an improved separate temperature control check valve in the air cleaner temperature sensor which will function to trap vacuum in the motor that is being controlled resulting in the full hot position of the motor and the associated control regardless of engine vacuum.

Another aspect of the invention is to provide such a device which will trap vacuum which will be progressively dissipated.

DESCRIPTION OF THE DRAWINGS

FIG. 1 is a partly diagrammatic view showing the air cleaner temperature sensor embodying the invention in position in an automotive vehicle system.

FIG. 2 is a longitudinal sectional view of the air cleaner temperature sensor.

FIG. 3 is a side elevational view showing the air cleaner temperature sensor prior to final assembly.

FIG. 4 is a sectional view taken along the line 4—4 in FIG. 3.

FIG. 5 is a sectional view taken along the line 5—5 in FIG. 2.

FIG. 6 is a part sectional view through a modified form of the invention.

FIG. 7 is a part sectional bottom view of the sensor shown in FIG. 6.

FIG. 8 is a fragmentary sectional view taken along the line 8—8 in FIG. 6.

FIG. 9 is a side elevational view of a further modified form of air cleaner temperature sensor.

FIG. 10 is a plan view of the same.

FIG. 11 is a sectional view on an enlarged scale taken along the line 11—11 in FIG. 10.

FIG. 12 is a side elevational view of a part of the air cleaner temperature sensor prior to assembly.

DESCRIPTION

Referring to FIG. 1, the air cleaner temperature sensor 20 embodying the invention is adapted to be used in a conventional system for controlling the blend of hot and cold air passing to the air cleaner and in turn the engine and is adapted to be positioned in the air cleaner 21 which has an air inlet 22 to which air is provided from a cold inlet 23 and a hot inlet 24, the latter being from the ambient surroundings of the engine or an exhaust heat box or chamber. A vacuum line 25 extends to the temperature sensor 20 and controls the vacuum being applied through a line 26 to a vacuum motor 27 which in turn controls a door 28 through a linkage 29 modulating the flow of hot air from inlet 24 and cold air from inlet 23.

Referring to FIG. 2, the temperature sensor 20 comprises a body made of a plastic such as nylon which is rigid in thick cross section and flexible in thin cross section. The body comprises a first part 30 and a second part 31. The first part 30 includes a bottom wall 32 having an opening 33 and a peripheral wall 34. A portion 35 of the peripheral wall is thickened and includes a vertical slot 36 for receiving one leg 37 of a bimetallic element 38. The other leg 39 of the bimetallic element 38 extends horizontally and is bifurcated to receive the end of a valve element 40 having an enlarged lower end 41 to control the opening 33. The thickened wall 35 includes a vertical extension 42 providing protection for the bimetallic element 38.

The first part 30 is molded with an integral cover 43 connected to the peripheral wall 34 along one edge by an integral hinge 44. Part 30 is molded with reinforcing ribs 32a along bottom wall 32 (FIG. 5). When molded, the cover 43 is in the plane of the top of part 30. The cover 43 is adapted to be moved to the broken line position as shown in FIG. 3 substantially covering the top of part 30. Cover 43 includes an integral rigid wall 45 at a right angle to the cover 43 that extends along an opposite peripheral wall portion. The wall 45 and wall portion of the body 30 have mechanically interconnected locking portions comprising a rectangular slot 46 in the wall 45 and a projection 47. Projection 47 is generally rectangular and has a downwardly and outwardly tapered surface 48 which is engaged by the wall 45 as the cover is swung into position flexing the wall 45 outwardly by engagement with the surface 48 until it snaps over the projection 47 locking under an upwardly and inwardly inclined surface 48a, with the resulting positioning of the projection 47 in the opening 46.

The second part 31 of the body includes a wall 50 having a tubular inlet 51 adapted to be connected to the vacuum line 25 and a tubular outlet 52 adpated to be connected to the motor line 26. Part 30 and part 31 have telescoping portions 53,54 which cooperate to define a chamber 55. The tubular inlet 51 and outlet 52 include orifices 56,57, respectively.

In assembling the temmperature sensor, the bimetallic element 38 and valve 40 are first assembled in the part 30 and then the part 31 is brought into position adjacent the part 30 and the seal is formed between the telescoping portion 53,54, preferably by ultrasonic welding. Alternatively, the parts may be adhered to one another.

The temperature sensor is then calibrated by moving the bimetallic temperature sensitive element 38 within the slot 36 until the temperature sensor operates at the desired temperature. The cover 43 is then swung into broken line position as shown in FIG. 3 to cover the temperature sensitive element 38. The resultant connection formed by the slot 46 and projection 47 effectively locks the cover without affecting the calibration setting of the temperature sensitive element.

In operation, the temperature sensor functions to control the amount of air permitted to flow into the chamber 55 through the valve outlet 33 in accordance with the temperature of the air in the air cleaner thereby modulating the vacuum passing to the motor 27 and in turn controlling the blend of hot and cold air passing to the air cleaner, in accordance with well-known practice.

In the form of the invention shown in FIGS. 6–8, the part 30 is substantially identical to the part 30 in the form of the invention shown in FIGS. 2–5. However, in this form the body comprises a second part 60 and a third part 61. The second part 60 includes a transverse wall 62 and the part 61 includes a transverse wall 63. Parts 30 and 60 have telescoping wall portions 54,64 which are sealed as by ultrasonic welding to form a chamber 65 and the parts 60,61 have telescoping portions 66,91 that are sealed as by ultrasonic welding to form a chamber 65a. Part 61 includes an integral vacuum inlet tube 68 having an orifice 69 therein and an integral vacuum outlet tube 70 that is adapted to extend to the vacuum motor.

A passage is provided between the vacuum inlet tube 68 and the chamber 65 by telescoping tubes 71,72 on the parts 60,61 respectively and a seal is provided between these parts by an O-ring 73 seated in a seat defined by shoulder 74 on the part 72 and cooperating shoulder 75 on tube 71. Alternatively, tubes 71,72 may have a tight fit and be welded ultrasonically.

The wall 62 further includes a plurality of openings 76 which are controlled by a resilient umbrella valve 77 having a peripheral lip 78 normally overlying the openings 76. A groove 79 in the surface of the wall 62 extends from one of the openings 76 beyond the periphery of the lip 78 of the umbrella valve 77.

In this form, the temperature sensor is first assembled by placing the valve in the part 30, placing the umbrella valve 77 in the part 60 and then assembling the part 30 and the part 60. O-ring 73 is installed onto tube 71, part 61 is installed onto part 60 and portion 67 is welded to portion 66. After assembly, the telescoping portions or tubes 71,72 form the communication between the vacuum inlet 68 and the chamber 65. The bimetallic element is then installed, calibrated and the cover is moved into position, as in the previous form.

In operation at low temperatures, the bimetallic element functions to provide maximum vacuum to the vacuum motor. If full throttle acceleration is encountered when the engine is cold, any variation or loss of vacuum caused thereby does not affect the operation of the motor since the vacuum trapped in chamber 67 will keep the vacuum motor in a position wherein only hot air will pass to the air cleaner for a predetermined time established by the size of metering groove 79. Valve 77 always functions as an orifice-check valve allowing immediate evacuation of vacuum motor 27 but delayed venting.

In the form of the invention shown in FIGS. 9–12, the maintenance of vacuum during acceleration when the engine is cold is achieved by an additional bimetallic element. Referring to FIG. 11, the body of the temperature sensor comprises a modified part 30a and a part 80, the parts 30a and 80 having telescoping portions 81,82 which are sealed to one another as by ultrasonic welding. The part 80 includes a wall 83 having tubular vacuum inlet 84 and vacuum outlet 85. A resilient seal member 86 in the form of an O-ring is held in position about the outlet 85 by an integral lip 99 and a snapping-acting bimetallic element 87 is yieldingly held in sealing engagement with seal member 86 by compression spring 88 that has one end thereof engaging the disc 87 and the other end thereof telescoped within a depression 89 in a closed projection 90. At cold temperatures, the bimetallic element 87 in cooperation with a seal 86 as a check valve functions to maintain any vacuum in the vacuum motor regardless of the acceleration of the engine. When the temperature reaches the normal temperature, the disc 87 moves away from the seal 86 and providing air to flow in either direction and permitting normal functioning of the temperature sensor. Thus, this form differs from that shown in FIGS. 6-8 in that no time delay is involved and vacuum is maintained until the temperature increases to snap the disc open.

In this form of the invention, the second part 80 is molded integrally with the part 30a and is connected thereto by an integral hinge 91. In assembly, the bimetallic element and valve member are positioned in the part 30a. O-ring 86 is first installed over integral lip 99, then the spring 88 and bimetallic element 87 are interposed between part 30a and the part 80 by holding the parts in position and swinging the part 80 into a position bringing a notch 93 thereon into a ramp 100 on the part 30a. While held in this position, the telescoping portions 81,82 are sealed as by ultrasonic welding. The bimetallic element may be installed and the temperature sensor can then be calibrated as previously described after which the cover 43 is swung into position and locked in the same manner as the previous forms of the invention.

I claim:

1. An air cleaner temperature sensor for use in a system for sensing the temperature of the air in an air cleaner and modulating the temperature of the air entering the air cleaner in response to the temperature in the air cleaner comprising a plastic body having an inlet adapted to be connected to a vacuum source and an outlet through which the vacuum can be connected to a motor for controlling the flow of air to the air cleaner, said body including an opening to the ambient air surrounding the body, a valve in said opening, a bimetallic element supported by said body and operable to control said valve element such that the flow of air through said ambient air inlet is controlled by said bimetallic element, said bimetallic element being generally L-shaped, said body having a slot therein into which one end of said element extends and is frictionally held, the other end of said bimetallic element engaging said valve member, a cover, an integral plastic hinge connecting said cover to said body, said cover having an integral wall connected thereto and extending along the side wall of said body, and interengaging mechanical means between said cover and a peripheral wall of said body for locking said cover in position.

2. The air cleaner temperature sensor set forth in claim 1 wherein said interengaging means comprises an opening in said integral wall of said cover, and a projection on the peripheral wall of said body engaging the opening in said wall of said cover.

3. The air cleaner temperature sensor set forth in claim 2 wherein said opening is generally rectangular, said projection comprising a generally rectangular configuration and having an outer surface tapering gradually outwardly and downwardly from the upper edge of the peripheral wall.

4. The air cleaner temperature sensor set forth in claim 3 wherein the lower edge of said wall of said cover terminates substantially at the lower edge of said peripheral wall of said body.

5. The air cleaner temperature sensor set forth in claim 1 wherein said body comprises a first part and a second part, said first part having a transverse wall in which said ambient air inlet is provided, said peripheral wall extending upwardly from said transverse wall and incorporating said slot into which said bimetallic temperature sensitive element extends, said second part including a transverse wall having said vacuum inlet and motor outlet therein and a peripheral wall, said first part having an integral peripheral wall telescoped within said peripheral wall of said second part, said telescoping peripheral walls being sealed to one another.

6. The air cleaner temperature sensor set forth in claim 5 wherein said seal is formed by ultrasonic welding.

7. The air cleaner temperature sensor set forth in claim 1 wherein said body comprises a first part, a second part, and a third part, said first part having a bottom wall defining said transverse wall having the ambient air inlet therein, said peripheral wall extending from said bottom wall, said second part having a transverse wall, said first and second parts having telescoping walls cooperating to form a seal and define a chamber, said second part and said third part having cooperating portions to define a third chamber, said vacuum inlet and motor outlet being in said third part, integral telescoping portions between said second part and said third part defining an opening extending from said vacuum inlet of said third part to said chamber between said first part and said second part, and sealing means between said last-mentioned telescoping portions, an opening extending between said first chamber and said second chamber, an umbrella valve having a peripheral lip overlying said opening in said second chamber and a metering groove in the surface of said transverse wall containing said opening and extending from said opening beyond the periphery of said peripheral lip of said umbrella valve.

8. The air cleaner temperature sensor set forth in claim 1 wherein said body comprises a first part and a second part, said first part and said second part having telescoping walls sealingly engaging one another to define a chamber communicating with said vacuum inlet, motor outlet and ambient air inlet, an annular resilient seal surrounding said motor outlet, and a bimetallic snap-action disc engaging said seal.

9. The air cleaner temperature sensor set forth in claim 8 including spring means yieldingly urging said bimetallic disc against said resilient seal.

10. The air cleaner temperature sensor set forth in claim 8 wherein said second part is connected to said first part by integral hinge means and means mechanically connecting said first part and said second part along the periphery thereof.

11. The air cleaner temperature sensor set forth in claim 10 wherein said last-mentioned means comprises a notch in the peripheral wall of said first part and a projection in said second part extending into said notch.

12. A body for an air cleaner temperature sensor for use in a system sensing the temperature of the air in an air cleaner and modulating the temperature of the air entering the air cleaner in response to the temperature in the air cleaner comprising said body being made of plastic and comprising a wall having an inlet adapted to be connected to a vacuum source and an outlet through which the vacuum can be connected to a motor for controlling the flow of air to the air cleaner, said body including an opening to the ambient air surrounding the body, a valve in said opening, a bimetallic element supported by said body and operable to control said valve element such that the flow of air through said ambient air inlet is controlled by said bimetallic element, said bimetallic element being generally L-shaped, said body having a slot therein into which one end of said element extends and is frictionally held, the other end of said bimetallic element engaging said valve member, said body comprising a first part and a second part, said first part having a transverse wall in which said ambient air inlet is provided, said peripheral wall extending upwardly from said transverse wall and incorporating said slot into which said bimetallic temperature sensitive element extends, said second part including a transverse wall having said vacuum inlet and motor outlet therein and a peripheral wall, said first part having an integral peripheral wall telescoped within said peripheral wall of said second part, said telescoping peripheral walls being sealed to one another.

13. The air cleaner temperature sensor set forth in claim 12 wherein said seal is formed by ultrasonic welding.

14. A body for an air cleaner temperature sensor for use in a system sensing the temperature of the air in an air cleaner and modulating the temperature of the air entering the air cleaner in response to the temperature in the air cleaner comprising said body being made of plastic and comprising a wall having an inlet adapted to be connected to a vacuum source and an outlet through which the vacuum can be connected to a motor for controlling the flow of air to the air cleaner, said body including an opening to the ambient air surrounding the body, a valve in said opening, a bimetallic element supported by said body and operable to control said valve element such that the flow of air through said ambient air inlet is controlled by said bimetallic element, said bimetallic element being generally L-shaped, said body having a slot therein into which one end of said element extends and is frictionally held, the other end of said bimetallic element engaging said valve member, said body comprising a first part, a second part, and a third part, said first part having a bottom wall defining said transverse wall having the ambient air inlet therein, said peripheral wall extending from said bottom wall, said second part having a transverse wall, said first and second parts having telescoping walls cooperating to form a seal and define a chamber, said second part and said third part having cooperating portions to define a third chamber, said vacuum inlet and motor outlet being in said third part, integral telescoping portions between said second part and said third part defining an opening extending from said vacuum inlet of said third part to said chamber between said first part and said second part, sealing means between said last-mentioned telescoping portions, an opening extending between said first chamber and said second chamber, an umbrella valve having a peripheral lip overlying said opening in said second chamber, and a metering groove in the surface of said transverse wall containing said opening and extending from said opening beyond the periphery of said peripheral lip of said umbrella valve.

15. A body for an air cleaner temmperature sensor for use in a system sensing the temperature of the air in an air cleaner and modulating the temperature of the air entering the air cleaner in response to the temperature in the air cleaner comprising said body being made of plastic and comprising a wall having an inlet adapted to be connected to a vacuum source and an outlet through which the vacuum can be connected to a motor for controlling the flow of air to the air cleaner, said body including an opening to the ambient air surrounding the body, a valve in said opening, a bimetallic element supported by said body and operable to control said valve element such that the flow of air through said ambient air inlet is controlled by said bimetallic element, said bimetallic element being generally L-shaped, said body having a slot therein into which one end of said element extends and is frictionally held, the other end of said bimetallic element engaging said valve member, said body comprising a first part and a second part, said first part and said second part having telescoping walls sealingly engaging one another to define a chamber communicating with said vacuum inlet, motor outlet and ambient air inlet, an annular resilient seal surrounding said motor outlet, and a bimetallic snap action disc engaging said seal.

16. The air cleaner temperature sensor set forth in claim 15 including spring means yieldingly urging said bimetallic disc against said resilient seal.

* * * * *